United States Patent
Zhang et al.

(10) Patent No.: US 9,459,137 B2
(45) Date of Patent: Oct. 4, 2016

(54) ACOUSTIC SENSOR SYSTEMS FOR IDENTIFICATION OF ARBITRARY WAVES

(71) Applicant: ENJOYOR COMPANY LIMITED, Hangzhou (CN)

(72) Inventors: Biaobiao Zhang, Hangzhou (CN); Hui Wang, Hangzhou (CN); Xiaohong Qian, Hangzhou (CN); Lihong Xu, Hangzhou (CN); Ke Lin Du, Hangzhou (CN)

(73) Assignee: ENJOYOR COMPANY LIMITED, Hangzhou (CN)

( * ) Notice: Subject to any disclaimer, the term of this patent is extended or adjusted under 35 U.S.C. 154(b) by 236 days.

(21) Appl. No.: 14/165,065

(22) Filed: Jan. 27, 2014

(65) Prior Publication Data
US 2015/0212221 A1    Jul. 30, 2015

(51) Int. Cl.
*G01H 1/00*    (2006.01)

(52) U.S. Cl.
CPC .................................... *G01H 1/00* (2013.01)

(58) Field of Classification Search
CPC ............. G01V 1/00; G01L 1/10; G01H 1/00
See application file for complete search history.

(56) References Cited

U.S. PATENT DOCUMENTS

| | | | | |
|---|---|---|---|---|
| 4,565,940 A * | 1/1986 | Hubbard, Jr. | ......... | B06B 1/0688 310/311 |
| 5,425,750 A * | 6/1995 | Moberg | ................... | G01P 15/18 600/595 |
| 2004/0065152 A1* | 4/2004 | Hull | ........................ | G01N 3/32 73/579 |
| 2006/0196280 A1* | 9/2006 | Xi | .............................. | G01L 1/08 73/862.625 |
| 2007/0176515 A1* | 8/2007 | Ting | ......................... | H02N 2/08 310/332 |

OTHER PUBLICATIONS

Biaobiao "Structural Configuration study for an acoustic wave sensor", Dissertation The University of Alabama, 2012, pp. 1-113.*
Kaushik et al. "A Review of the Role of Acoustic Sensors in the Modern Battlefield." 11th AIAA/CEAS Aeroacoustics Conference (26th AIAA Aeroacoustics Conference), May 23-25, 2005, 13 pages.
Hoummady et al. "Acoustic wave sensors: design, sensing mechanisms and applications." Smart Mater. Struct. 6 (Jul. 9, 1997) pp. 647-657.

(Continued)

*Primary Examiner* — Luke Ratcliffe
*Assistant Examiner* — Hovhannes Baghdasaryan
(74) *Attorney, Agent, or Firm* — Amin, Turocy & Watson, LLP

(57) ABSTRACT

Arbitrary wave loads are detected and reconstructed by a sensor system based on an inverse mechanism of continuous structure responses. A sensor system comprising a sensing component configured with a sandwich-structured beam of composite materials can generate the structural responses as a moving wave propagates across the beam. In one example, an Arnoldi-Tikhonov algorithm coupled with generalized cross-validation technique can be utilized to determine a regularization parameter that is utilized to compensate for the presence of noise in the wave load and/or the highly ill-posed problems of the inverse matrix that is utilized for wave reconstruction. Further, the Tikhonov algorithm can be utilized to reconstruct wave loads (e.g., at different location on the beam and/or different times) based on the structural response parameters and the regularization parameter. As an example, an image of the determined wave load values can be rendered in three dimensions (3-D) versus time and location.

16 Claims, 15 Drawing Sheets

(56) References Cited

OTHER PUBLICATIONS

Zhang et al. "Configuration study of an acoustic wave sensor on a continuous elastic support." Smart Mater. Struct. 21 (Jan. 11, 2012) 11 pages.

Hansen. "Regularization Tools: A Matlab Package for Analysis and Solution of Discrete Ill-Posed Problems." Version 4.0 for Matlab 7.3, Sep. 2007, 128 pages.

Novati et al. "A GCV based Arnoldi-Tikhonov regularization method." BIT Numerical Mathematics, Apr. 2, 2013, 22 pages.

Kahya et al. "Dynamic Analysis of Composite Sandwich Beams Under Moving Mass." KSU. Journal of Engineering Sciences, 14(1), 2011, pp. 18-25.

Conte et al. "Consistent Finite-Element Response Sensitivity Analysis." Journal of Engineering Mechanics, Dec. 2003, pp. 1380-1393.

J.N. Reddy. "Solutions Manual for an Introduction to the Finite Element Method." McGraw-Hill, New York, 2005, 423 pages.

* cited by examiner

ACOUSTIC SENSOR SYSTEMS FOR IDENTIFICATION OF ARBITRARY WAVES

TECHNICAL FIELD

The subject disclosure relates to acoustic sensors, e.g., to continuous arbitrary wave sensors.

BACKGROUND

Various sensors have been developed and widely utilized in different fields, such as acoustic sensors, pressure sensors, thermal sensors, etc. Oftentimes, acoustic sensors utilize sensing films that are substrated into a piezoelectric material to determine moving wave loads or external forces. In accordance with the piezoelectricity phenomenon, when a mechanical wave propagates through the sensor, the mechanical stress of the wave on the sensing film introduces a change in an electric output. However, the electro-mechanical conversion process of the piezoelectric sensors can introduce significant errors during determination of wave loads leading to lower sensing accuracy and reliability.

Conventional acoustic sensors can identify wide range targets since they are capable of searching a wide range of frequencies and angles of incoming wave signals generated by distance objects, for example, hostile artilleries and/or weapons. However, when acoustic sensors are utilized to track multiple objects, background disturbance causes random effects on measurement data leading to a significant negative influence on the estimation performance of the acoustic sensor. Further, a large footprint is often required for sensor arrays to determine moving wave loads accurately.

SUMMARY

The following present a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can facilitate sensing and reconstruction of continuous arbitrary waves. In one aspect, the system can comprise a memory configured to store computer-executable components, and a processor, communicatively coupled to the memory, configured to execute or facilitate execution of the computer-executable components, wherein the computer-executable components comprising: a sensing component configured to determine displacement response parameter data as a wave is determined to propagate through a beam structure of a sensor, and an analysis component configured to determine, based on an inverse analysis that employs the displacement response parameter data, load data representing the wave.

Another aspect of the disclosed subject matter relates to a method that can be employed to determine, as a function of a wave propagating through a beam structure of a sensor, displacement response parameter data associated with the beam structure. Further, the method can determine load data that is employable to reconstruct the wave based on an inverse analysis that employs the displacement response parameter data.

In accordance with yet another aspect, the disclosed subject matter relates to a computer readable medium comprising computer-executable instructions that, in response to execution cause a system comprising a processor to perform operations, comprising: determining structural response parameter data associated with a sensor comprising a beam structure, wherein the structural response parameter data is indicative of a structural response of the sensor under a load exerted by a wave travelling across the beam structure; and determining, based on an inverse analysis of the structural response parameter data, reconstruction data that facilitates a rendering of the wave.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
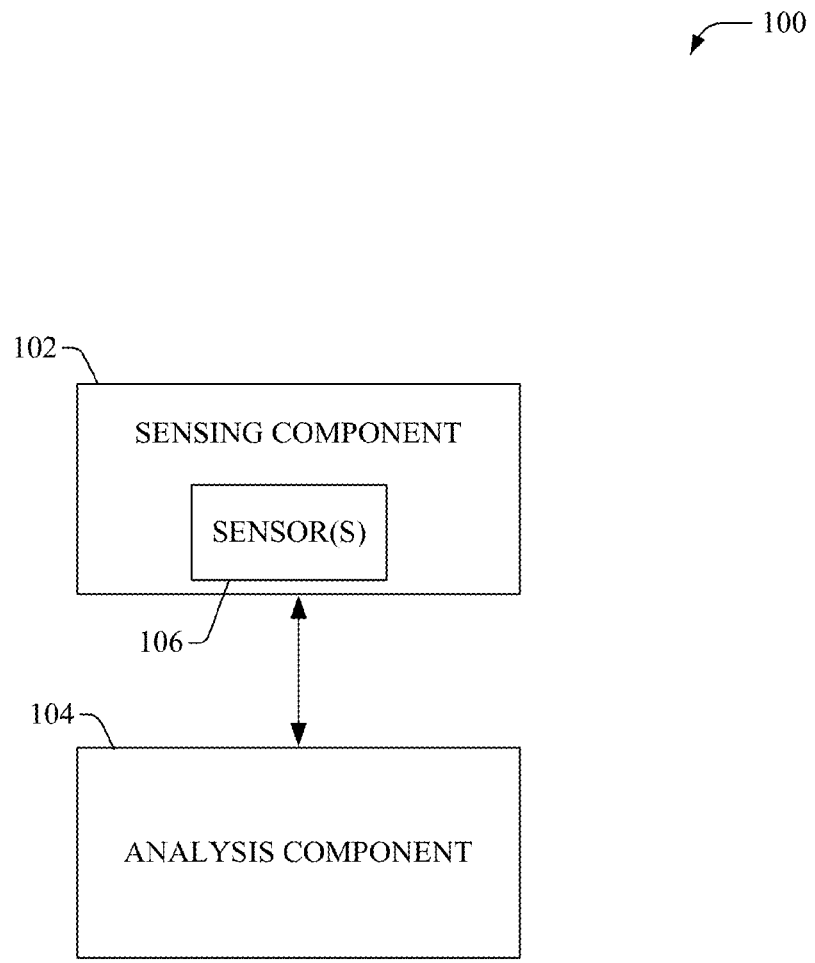
FIG. 1 illustrates an example system that facilitates sensing and identification of arbitrary wave loads.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "controller," or the like are generally intended to refer to a computer-related entity, either hardware, a combination of hardware and software, software, or software in execution or an entity related to an operational machine with specific functionality(ies). For example, a component may be, but is not limited to being, a process running on a processor, a processor, an object, an executable, a thread of execution, computer-executable instructions, a program, and/or a computer. For instance, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the words "example" and "exemplary" are used herein to mean serving as an instance, or illustration. Any aspect or design described herein as "example" or "exemplary" is not necessarily to be construed as preferred or advantageous over other aspects or designs. Rather, use of the word example or exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The systems and methods disclosed herein facilitate sensing and identifying arbitrary wave loads. In one aspect, a beam with an elastic foundation support is employed to detect a moving wave load. Further, a regularization technique (e.g., Tikhonov regularization technique) is utilized for wave propagation analysis when an acoustic wave is determined to propagate through the beam. As an example, the systems and methods disclosed herein provide efficient and low cost wave sensing that can be utilized for various applications, such as, but not limited to security and/or disaster recovery.

The following description and the annexed drawings set forth certain illustrative aspects of the specification. These aspects are indicative, however, of but a few of the various ways in which the principles of the specification may be employed. Other aspects and embodiments of the specification will become apparent from the following detailed description of the specification when considered in conjunction with the drawings.

Referring initially to FIG. 1, there illustrated is an example system 100 that facilitates sensing and identification of arbitrary wave loads, according to an aspect of the subject embodiments. In contrast to sensors that rely on the error-prone piezoelectricity phenomenon, the system 100 facilitates a determination of moving wave loads by utilizing an inverse mechanism of a continuous structure response. Moreover, system 100 can be utilized in various applications, such as, but not limited to military, earthquake, rescue, automotive, and/or medical applications to predict wave propagation. For example, system 100 can be utilized in seismic warning systems to detect small P-waves that are the first sign of an earthquake. The P-waves can be analyzed to calculate/predict a size of a following S-wave, and appropriate personnel can be alerted on the size and/or scope of the earthquake. In another example, system 100 can be utilized in a disaster recovery/rescue system to locate and facilitate rescue of the survivors after a natural or manmade disaster. For example after an earthquake, the system 100 can be utilized to process signals emanating from the survivors trapped inside damaged buildings through successfully filtering other signals or noise.

According to an embodiment, system 100 comprises a sensing component 102 that can utilize one or more wave load sensors 106 to generate displacement responses when moving waves propagate across the one or more wave load sensors 106. In an aspect, the wave load sensor 106 comprises a beam (or a beam-like) structure and an elastic foundation base supporting the beam structure. In one example, the beam can be a sandwich-structured beam created with composite materials. Moreover, the wave load sensor 106 can operate passively, and requires no local, active electronic circuits. Using active electronic circuits in a sensor limits the environmental conditions in which they can be deployed. Due to utilization of active circuits, traditional sensors cannot tolerate wide temperature variations and are susceptible to failure in high radiation environments. In addition, active circuits increase cost and complexity, and can decrease reliability of the sensor system. As a wave passes through the beam structure, the sensing component 102 determines displacement response parameters, which are input to an analysis component 104.

The analysis component 104 utilizes one or more inverse methods for reconstructing and/or predicting moving wave loads. In one example, the analysis component 104 can utilize an Arnoldi-Tikhonov method coupled with generalized cross-validation, described in detail infra, for the computation of a regularization parameter. The Tikhonov regularization method is effective for regularizing ill-posed problems, especially for solving large inverse problems in practical engineering. As an example, a problem is ill-posed (or ill-conditioned) if small errors in the input data may produce large errors in the solution. Accordingly, the determined regularization parameter can be utilized by the analysis component 104 to reconstruct wave loads from determined displacement responses based on the Tikhonov regularization method. It is noted that although the Arnoldi-Tikhonov method and Tikhonov regularization method have been described herein, the subject system can utilize most any inverse methods to determine and/or facilitate a determination of the wave loads. In one aspect, the analysis component can generate and/or facilitate rendering (e.g., via most any display device) of an image that represents wave prediction values in three dimensions (3-D) versus time and location.

Figure 2A:
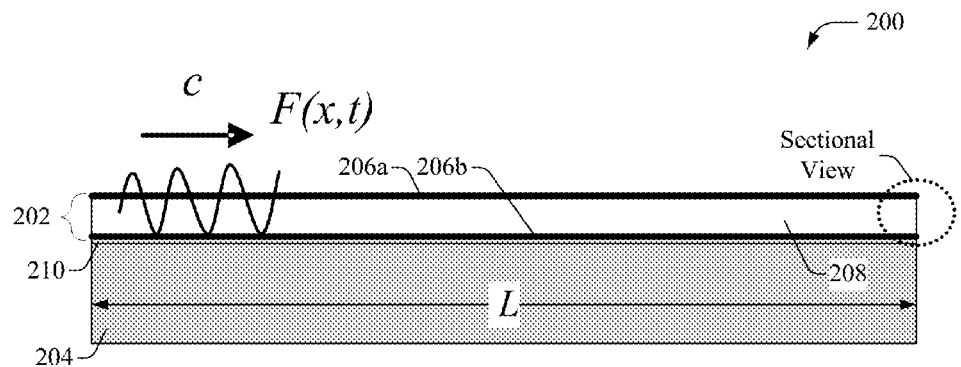
FIGS. 2A-2B illustrate example views of a wave load sensor for predicting moving wave loads.
Figure 2B:
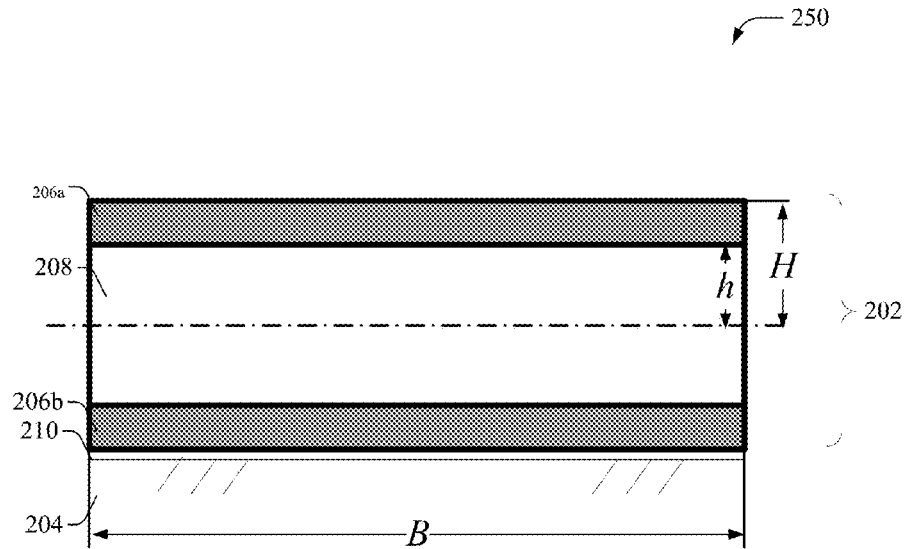

Referring now to FIGS. 2A and 2B, there illustrated are example views (200, 250) of a wave load sensor 106 for predicting moving wave loads in accordance with an aspect of the subject disclosure. It can be noted that the wave load sensor 106 can be part of (and/or coupled to) sensing component 102, as more fully described herein, for example, with regard to system 100. View 200 depicts an elevation of the wave load sensor 106 subjected to moving wave loads and view 250 depicts a sectional view of the wave load sensor 106. In one aspect, the wave load sensor 106 can comprise a beam (or beam-like) structure 202 that generates displacement responses when a moving wave propagate across it and an elastic foundation base 204 (e.g., comprising most any material that has a defined elasticity characteristic) that supports the beam structure 202. As an example, the beam structure 202 is sandwich-structured beam that can be made of composite materials (e.g., carbon/epoxy and/or foam materials) and the elastic foundation base 204 can be made of soft materials (e.g., rubber). Moreover, the beam structure 202 with composite materials can be fabricated by attaching two thin (but stiff) carbon/epoxy facings (206a, 206b) to a light-weighted (but thick) foam material core 208. The foam core can be of low strength, but its high thickness (2h) provides this sandwich-composite with high bending stiffness and an overall low density. The beam structure 202 can be bonded to the elastic foundation base 204 by most any bonding agent 210, such as, but not limited to an epoxy adhesive (e.g., Hysol EA 9430). It is noted that the sensor fabrication is not limited to the above noted materials. For example, various other materials utilized to fabricate the sensor, such as, but not limited to, composite with E-glass/epoxy surface layer and a Balsa wood core layer. Using composite materials such as carbon/epoxy and foam to configure the wave load sensor 106 has several advantages compared to utilizing conventional materials, such as metals. For example, the composite materials (e.g., carbon/epoxy and foam) are lighter in weight as compared to metals and/or are less affected by background noise (e.g., metals are significantly affected when the background noise is up to a level of 20%).

In one aspect, both ends of the wave load sensor 106 are with free boundary conditions. Typically, information provided at the instant when the wave load moves onto the sensor structure is lost due to the restraints at the edges, because displacement responses at these sites are always zero. In contrast, with free boundary conditions at the sensor ends, displacement responses at ends are not always zero, thus full response information is available for reconstructing the wave.

Further, the wave load sensor 106 employs time-of-flight information to facilitate detection of a sound wave. In one aspect, transient displacement responses for N locations along the middle line direction on the sensor structure are determined. As an example, N=25 divisions for the beam length can be utilized in order to calculate whole displacement responses of the wave load sensor 106. It is to be noted that most any number of locations/divisions wherein N is an integer greater than 24 can be utilized for the finite element analysis convergence in this model. The time-of-flight displacement responses under excitation of the time-of-flight sound wave passing by are represented by the transient responses at these locations. The time-of-flight displacement responses can then be provided as input parameters, to the program of Arnoldi-Tikhonov algorithm (e.g., implemented by the analysis component 104) for reconstruction of the time-of-flight sound wave.

In one aspect, the wave load sensor depicted in FIGS. 2A and 2B can operate with a frequency range of about 13 Hz to about 10 kHz. Further, the wave load sensor can provide an image of wave prediction values in three dimensions (3-D) versus time and location. Furthermore, the wave load sensor is capable of determining wave loads at any time when wave is passing by, and/or determining the wave propagation direction.

Figure 3:
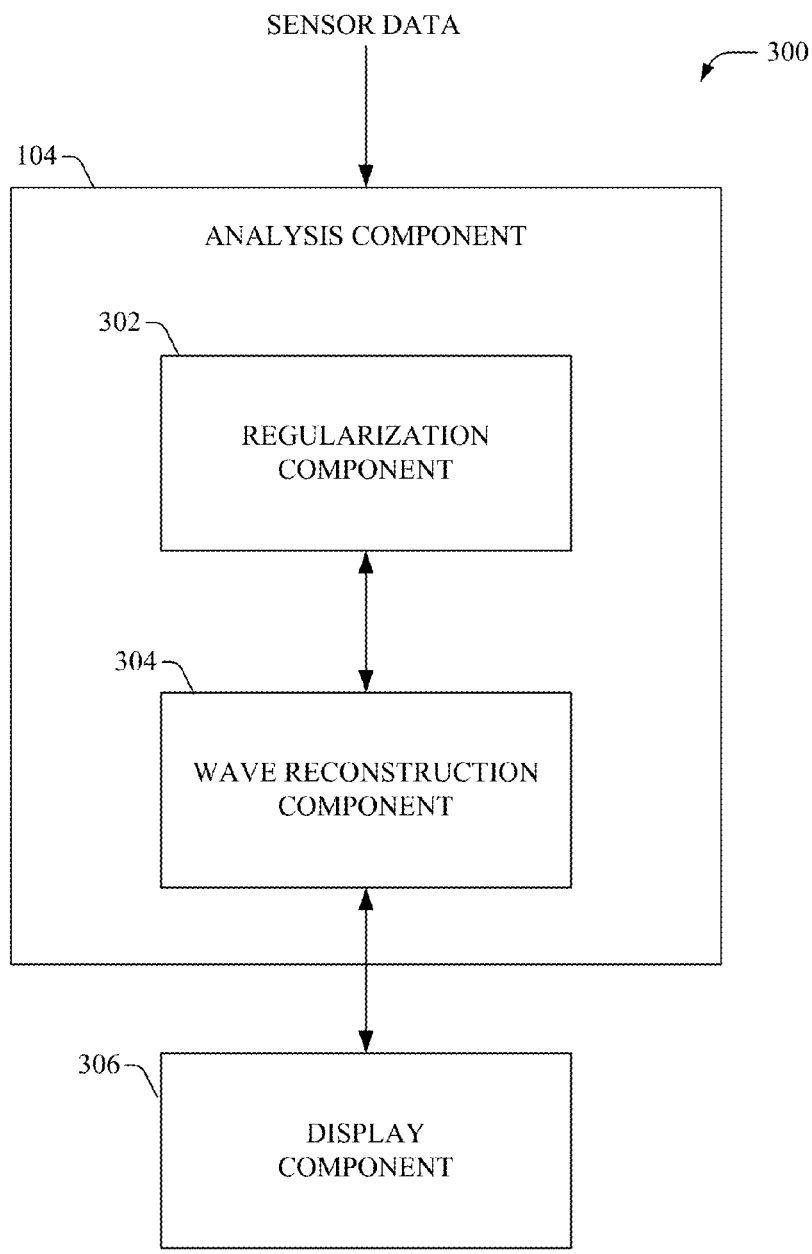
FIG. 3 illustrates an example system that facilitates reconstruction of a moving wave load.

Referring now to FIG. 3, there illustrated is an example system 300 that facilitates reconstruction of a moving wave, according to an aspect of the subject embodiments. It can be noted that the analysis component 104, can include functionality, as more fully described herein, for example, with regard to system 100.

According to an aspect, if displacement responses under the wave load f traveling across the wave load sensor (depicted in FIGS. 2A and 2B) are known, the wave load can be calculated by an inverse method as follows:

$$w = A \times f, \quad (1)$$

wherein w represents a displacement response vector, which is assumed to be known (e.g., determined by sensing component 102), A represents an inverse matrix with highly ill-posed problems, and f represents a moving wave load vector that is to be calculated. Because of the ill-conditioning of A and the presence of noise in w, regularization is employed for solving this problem. An ill-conditioned problem is a problem with a high conditioning number (e.g., a large number, typically, not close to 1). In one aspect, the condition number of a function (e.g., solution of a problem) with respect to an argument (e.g., data in a problem) measures how much the output value of the function can change for a small change in the input argument. The condition number is an application of the derivative, and can be defined as the value of the asymptotic worst-case relative change in output for a relative change in input. The condition number can be determined based on a geometry of the matrix (e.g., matrix A). A problem with a low condition number can be considered as well-conditioned, while a problem with a high condition number can be considered as ill-conditioned. Practically, an ill-conditioned matrix is almost singular, and the determination of its inverse, or solution of a linear system of equations, is prone to large numerical errors. In one aspect, regularization component 302 can be employed to determine a regularization parameter that can be utilized to compensate for these numerical errors.

In one example, the regularization component 302 can utilize a Tikhonov regularization method, to solve the following minimization problem:

$$\min\{\|A \times f - w\|^2 + \lambda^2 \|f\|^2\}, \quad (2)$$

wherein, $\lambda > 0$ is the regularization parameter. The regularization component 302 can apply various inverse methods determine the regularization parameter. For example, the regularization component 302 can apply an L-curve method that determines a suitable value of the regularization parameter when solving discrete ill-posed problems by Tikhonov regularization. L-curve is a log-log plot of the squared norm of the regularized solution versus the squared norm of the regularized residual for a range of values of the regularization parameter. The L-curve criterion for choosing the regularization parameter comprises locating a corner of the L-curve. The optimal regularized solution lies at the L-curve's corner. However, this criterion has its limitation in certain cases: For example, it is not easy to obtain the corner point from the L-curve method, as the curve is almost a straight line. To solve this issue, the regularization component 302 can apply a general cross validation (GCV)-based Arnoldi-Tikhonov regularization method for determining the regularization parameter more effectively, as described in detail infra.

The GCV method based on the Arnolds process is an iterative method to determine regularization parameter. For example, for a given starting displacement w, the Eqn. (2) can be projected onto Krylov subspace $K_m(A,w)=\text{span}\{w, Aw, \ldots, A^{m-1}w\}$.

The Arnoldi process can be organized as follows:

i. Let the initial variables be $u_1 = \frac{w}{\|w\|}$, $w \in R^N$ ii. Determine $\eta = Au_i$, $(i = 1, \ldots, m)$ and $h_{ij} = (\eta, u_j), j = 1, 2, \ldots, i$ iii. Circularly calculate $\eta = \eta - h_{i,j}u_j$ iv. Finally, determine $h_{j+1,j} = \|\eta\|$ and $u_{j+1} = \eta/h_{j+1,j}$.

Based on the above, the regularization component 302 can determine an orthonormal matrix $U_{m+1}=[u_1, u_2, u_3, \ldots, u_m, u_{m+1}] \in R^{N \times (m+1)}$, whose columns are orthonormal bases of Krylov subspace $K_m(A,w)$ and the decomposition is given by:

$$AU_m = U_{m+1}\tilde{\Psi}_m, \quad (3)$$

wherein $$\tilde{\Psi}_m = \begin{pmatrix} \Psi_m \\ h_{m+1,m}e_m^T \end{pmatrix},$$

with $\Psi_m$ being an upper Hessenberg matrix, $(h_{ij}) \in R^{m,m-1}$, and $e_m = (0, \ldots, 0, 1)^T \in R^m$. Further, the regularization component 302 can determine an approximate solution $x_{\lambda,m}$ in the Krylov subspace. Substituting $f=U_m y_m$, $y_m \in R^m$ into Eqn. (3) and using Eqn. (2) yields the following reduced minimization problem $$\min_{y_m \in R^m} \left\{ \left\| \begin{pmatrix} \tilde{\Psi}_m \\ \lambda U_m \end{pmatrix} y_m - \begin{pmatrix} \|w\|e_1 \\ 0 \end{pmatrix} \right\| \right\}. \quad (4)$$

In one aspect, the regularization component 302 can employ the GCV method to estimate the regularization parameter $\lambda$ for the Tikhonov regularization inverse problem illustrated in Eqn. (2), which is minimized as a function of the parameters:

$$|G(\lambda)| = \frac{\|w - Af_\lambda\|^2}{[\text{trace}(I - AA_\lambda)]^2}, \quad (5)$$

wherein the numerator is the squared residual norm and the denominator is a squared effective number of degrees of freedom. The GCV criterion is then based on the choice of $\lambda$ that minimizes $|G(\lambda)|$. This minimization is generally ill-conditioned, since the function $G(\lambda)$ is typically flat in a relatively wide region around the minimum. Consequently, this criterion may even lead to poor regularization. In this example scenario, the regularization component 302 can fully exploit the approximation properties of the Arnoldi algorithm noted above. In one aspect, the regularization component 302 can determine a sequence of regularization parameters $\{\lambda_m\}$, e.g., for each iteration of the Arnoldi algorithm, by the minimization of the following GCV function approximations:

$$|G_m(\lambda)| = \frac{\|\tilde{\Psi}_m y_{m,\lambda} - \|w\|e_1\|^2}{\left(m + 1 - \sum_{i=1}^{m} \frac{\lambda^2}{r_i^{(m)2} + \lambda^2}\right)^2}, \quad (6)$$

wherein $y_{m,\lambda}$ solves the reduced minimization. It can be noted that $$\|\tilde{\Psi}_m y_{m,\lambda} - \|w\|e_1\|^2 = \|w\|^2 \sum_{i=1}^{m} \left(\frac{\lambda^2}{r_i^{(m)2} + \lambda^2} u_i^{(1)T}\right)^2 + (u_{m+1}^{(1)T})^2, \quad (7)$$

wherein $r_i^{(m)}$ (i=1, 2, 3, . . . , m) is the generalized singular values of $\tilde{\Psi}_m$, and m denotes the number of iterations. An example algorithm can be organized as follows:

i. Compare the residual $r_m = \tilde{\Psi}_m y_m - \|w\|e_1$.
ii. Compare $\|\|r_m\| - \|r_{m-1}\|\|/\|r_m\|$ with predefined error $\delta$.
iii. If $\|\|r_m\| - \|r_{m-1}\|\|/\|r_m\| \leq \delta$ and $y_{opt,m} = y_m$, then compute $f_m = U_m y_m$.

Otherwise, continue next iteration, until $\|\|r_m\| - \|r_{m-1}\|\|/\|r_m\| \leq \delta$.

Referring back to FIG. 3, a wave reconstruction component 304 is employed to utilize the regularization parameter (e.g., determined by the regularization component 302) to determine the wave load and reconstruct the waveform. In order to evaluate potential structural configurations for such a sensor and methods for reconstructing the transient and distributed forcing function, the wave reconstruction component 304 can first examine the response of a simple beam configuration using various simulation methods. This response can then be utilized as the input for traveling-wave force reconstruction. Since the reconstructed forces may include large errors through the inversion of an ill-conditioned matrix, the wave reconstruction component 304 can utilize regularization methods, such as, but not limited to, Tikhonov regularization combined with the GCV method. Utilization of the Tikhonov regularization combined with the GCV method can improve the extraction of the arbitrarily shaped wave loads from the beam's response. The GCV method is employed by the regularization component 302 to select the regularization parameter. Various levels of random noise are also considered to simulate issues associated with actually measuring a response to examine the stability of this force inverse process. Input variable values are listed below in Table 1 and Table 2.

TABLE 1

| Item | Description | Unit | Value |
|------|-------------|------|-------|
| L | Beam length | m | 0.5 |
| B | Beam width | m | 0.01 |
| H | Sandwich thickness | m | 0.0005 |

TABLE 1-continued

| Item | Description | Unit | Value |
|---|---|---|---|
| C | Wave speed | ms$^{-1}$ | 343 |
| T | Half-cycle duration | sec | 0.0005 |
|  | Poisson's ratio |  | 0.33 |
| TH | Foundation thickness | m | 3 |
| $E_F$ | Foundation Young's modulus | MPa | 2.3 |
| $K_E$ | The number of half-cycles |  | 1 |
| h | Beam thickness | m | 0.5 H |

TABLE 2

| Material | ρ (kg/m$^3$) | E11 (GPa) | E22 (Gpa) | G12 (Gpa) | V12 |
|---|---|---|---|---|---|
| Carbon/Epoxy | 1600 | 177 | 10.8 | 76 | 0.270 |
| Foam | 11.2 | 85.53E−05 | 85.53E−05 | 31.40E−05 | 0.362 |

As discussed above, if displacement responses under the wave load vector f traveling cross the wave load sensor are known, the wave load vector can be calculated by Eqn. (1). To solve Eqn. (1), the wave reconstruction component 304 employs Tikhonov regularization. This is known as ridge regression. For the problem given by Equation (1), the standard approach is known as ordinary least squares and seeks to minimize the residual $\|A \times f - w\|^2$, wherein $\|\cdot\|$ is the Euclidean norm. This problem is overdetermined because A is ill-conditioned. In order to give preference to a particular solution with desirable/optimal properties, the regularization parameter (e.g., determined by the regularization component 302) is included in the minimization Eqn. (2). In one aspect, the regularization improves the conditioning of the problem, hence enabling a direct numerical solution. An explicit wave load solution, denoted by $\hat{f}$, is determined by the wave reconstruction component 304 as follows:

$$\hat{f} = (AA^T + \lambda^2 I)^{-1} A^T w \quad (8)$$

According to an embodiment, information associated with the wave load solution can be provided to a display component 306 that can be coupled (remotely or locally) to the analysis component 104 and/or the sensing component 102. As an example, the display component 306 can include, but is not limited to most any electronic device (or a portion thereof), such as, but not limited to, a monitor, a liquid-crystal display (LCD) screen, a light-emitting diode (LED) screen, a television, a touch screen, a mobile communication device, a tablet computer, a personal computer, a laptop computer, etc. The display component 306 can display, to a user, the reconstructed wave load in one or more different formats/views. Additionally or alternatively, the information associated with the wave load solution can be provided to additional processing modules (not shown), such as, but not limited to, disaster/rescue/emergency services, earthquake alert system, weather systems, etc. that can further process the information, e.g., to compute a distance from the source of the wave, to determine a location of the source, to predict a size/scope of an earthquake, etc. Accordingly, system 300 provides an efficient and accurate technique to predict/infer/determine complicated moving wave loads through the inverse process in addition to determining moving single loads.

Figure 4:
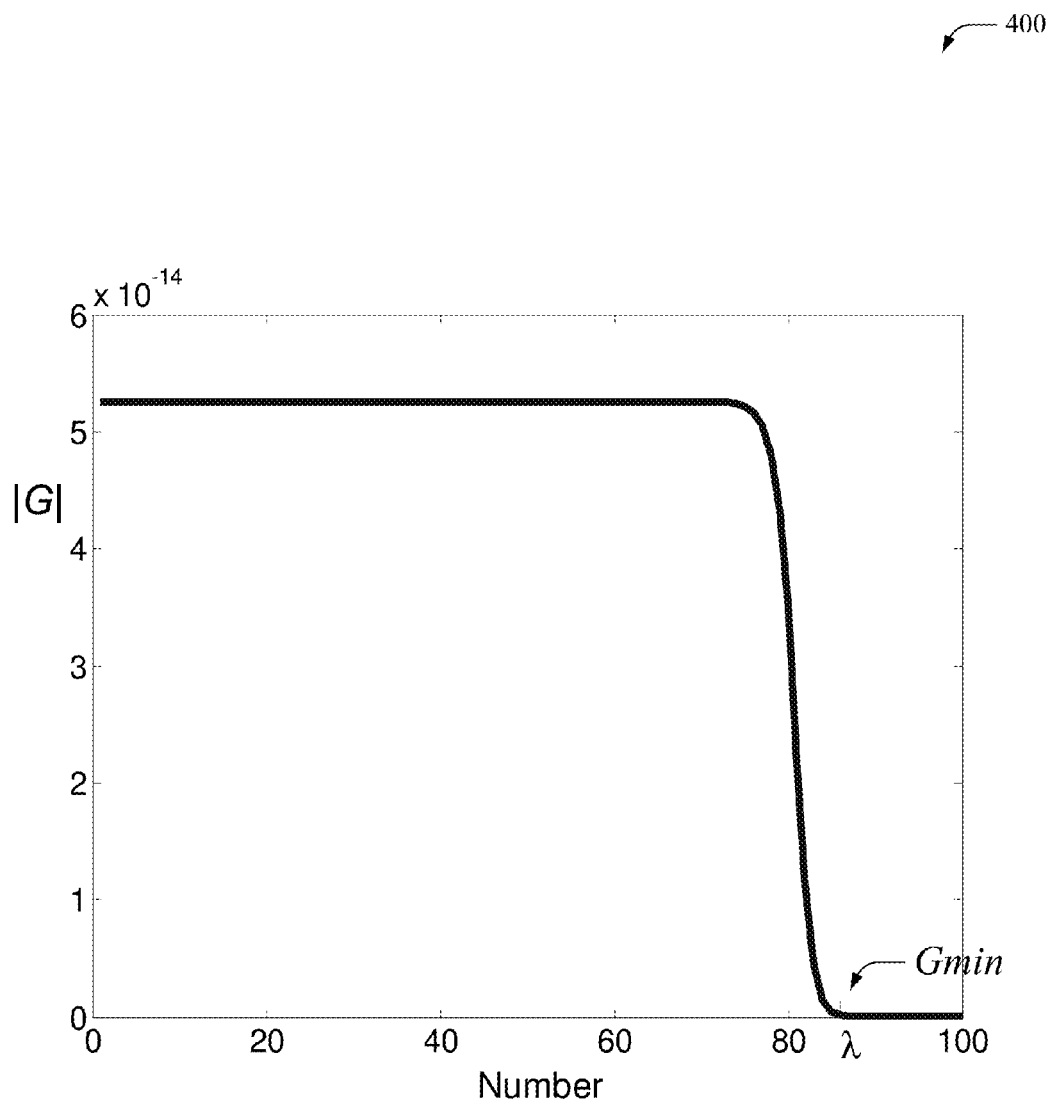
FIG. 4 illustrates an example plot utilized for selecting a regularization parameter.

Referring now to FIG. 4 there illustrated is an example plot 400 utilized for selecting a regularization parameter λ in accordance with an aspect of the subject disclosure. The plot 400 depicts is a log-log plot of a squared norm of the regularized solution versus a squared norm of the regularized residual for a range of values of the regularization parameter. In one example, the regularization component 302 can determine the plot 400 to select regularization parameter. The inverse process employed by the regularization component 302 is an ill-posed problem. The regularization method described above with respect to FIG. 3 is implemented by the regularization component 302. The regularization parameter λ is optimized when |G| reaches the minimum value ($G_{min}$).

Figure 5A:
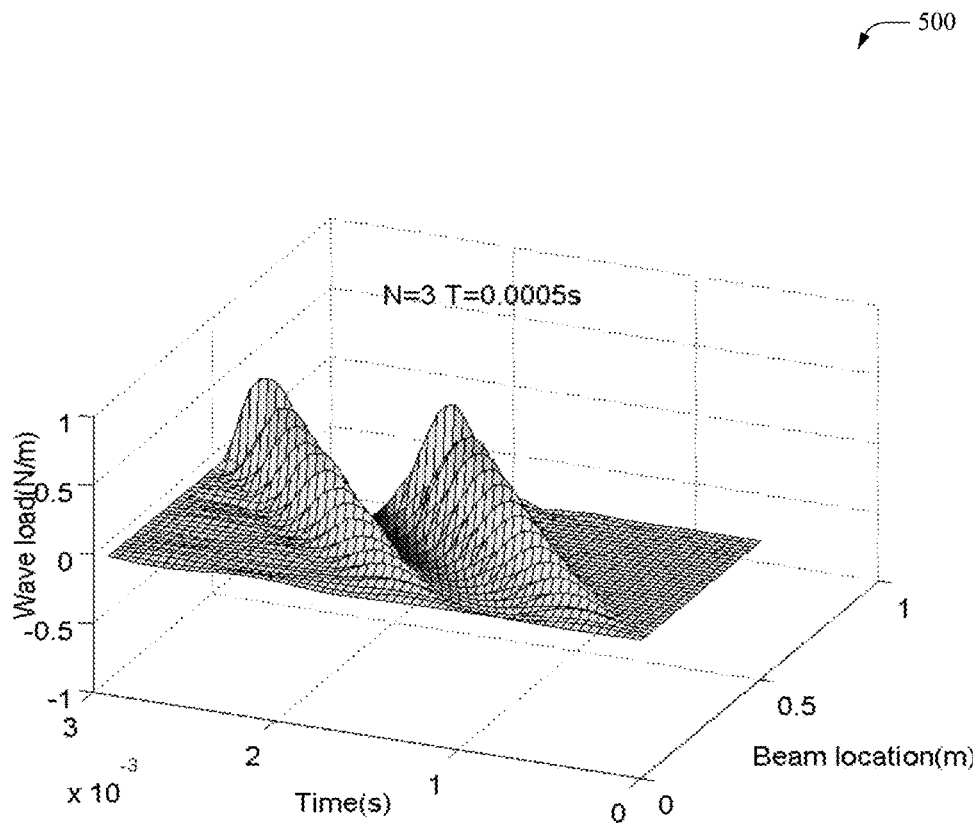
FIGS. 5A-5C illustrate example plots that depict reconstruction results of moving sinusoidal wave loads with a sine function amplitude variance.
Figure 5B:
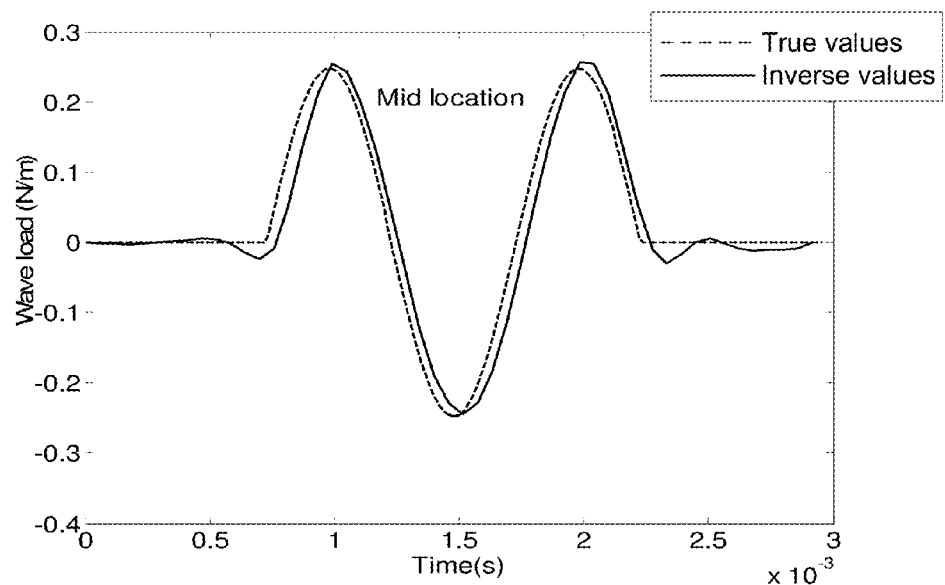
Figure 5C:
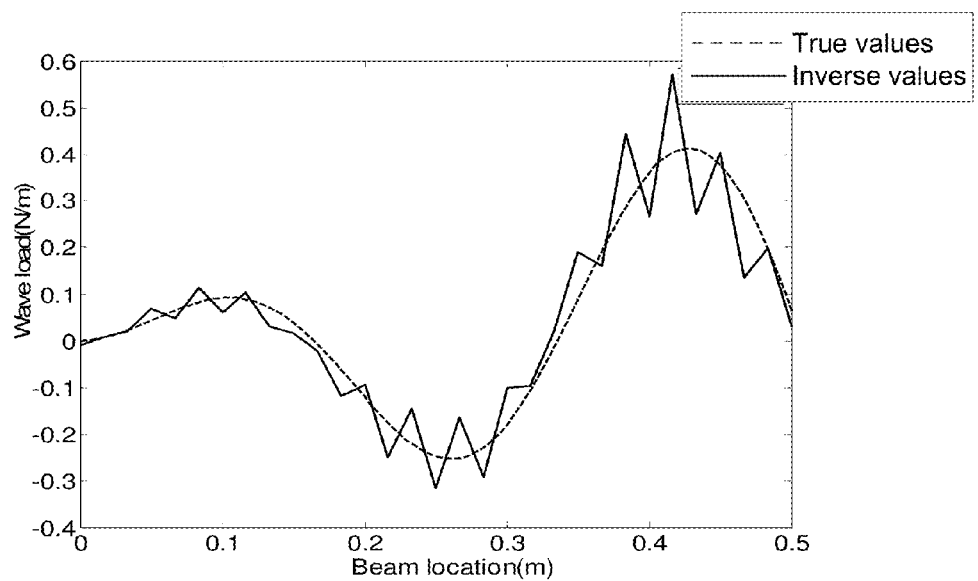

Referring now to FIGS. 5A-5C there illustrated are example plots (500, 525, and 575) that depict reconstruction results of moving wave loads with a sine function amplitude variance. The moving wave loads (e.g., inverse values determined by analysis component 104) are compared with true values (e.g., expected values) under background disturbance/noise level of 2%. In one aspect, the plots (500, 525, and 575) can be determined by analysis component 104 and rendered via display component 306. Plots (500, 525, and 575) depict a three half-cycle wave load with a half-cycle period of 0.0005 s. The amplitude of the sinusoidal wave loads in each case is sin(x) Nm$^{-1}$, wherein x represents a beam location along the length direction, considering that the actual acoustic wave load amplitude is not constant and possibly varies with time and location.

Consider an example scenario wherein the wave load begins to progressively step on the beam structure until it is entirely on the beam structure. The wave load can be expressed as:

$$F(x, t) = -a(x)\sin\left\{\frac{2\pi}{T}(x - ct)\right\}\{1 - \hat{H}(x - ct)\}, \ 0 \le t \le NT, \quad (9a)$$

wherein N is the number of half-cycles, T is half-cycle time period, and $\hat{H}$ is the Heaviside step function. The speed of the wave is denoted by c, which for the example cases considered herein can be the speed of sound in air. Amplitude is a(x)=sin(x), with x being the location along the length direction of the beam sensor. The equation (9a) represents a discrete number of half-cycles in a traveling sinusoidal wave. Once the load is completely on the sensor beam, the force can be expressed as:

$$F(x, t) = -a(x)\sin\left\{\frac{2\pi}{T}(x - ct)\right\}\{\hat{H}(x - c(t - NT)) - \hat{H}(x - ct)\}, \quad (9b)$$

$$NT \le t \le L/c,$$

until it reaches the other end of the beam structure. Finally, as the wave load begins to leave the beam structure, the force can be expressed as:

$$F(x, t) = -a(x)\sin\left\{\frac{2\pi}{T}(x - ct)\right\}\{\hat{H}(x - c(t - NT)) - \hat{H}(x - ct)\}, \quad (9c)$$

$$L/c \le t \le L/c + NT$$

Figure 6A:
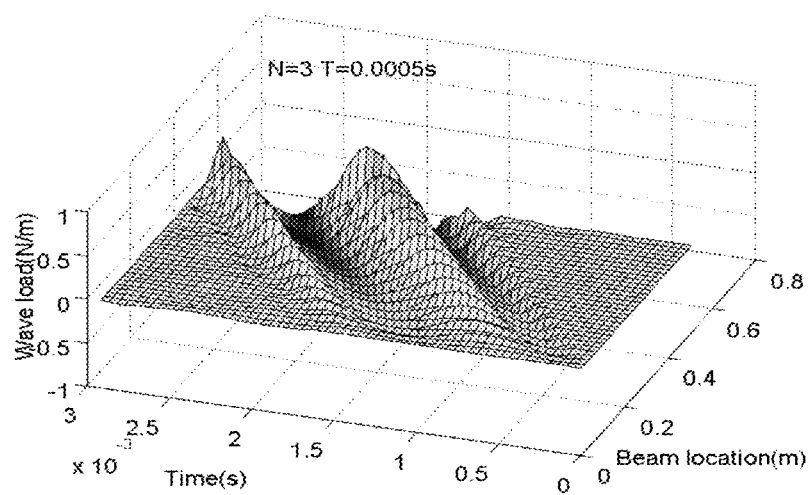
FIGS. 6A-6C illustrate example plots that depict reconstruction results of moving cosinusoidal wave loads with a sine function amplitude variance.
Figure 6B:
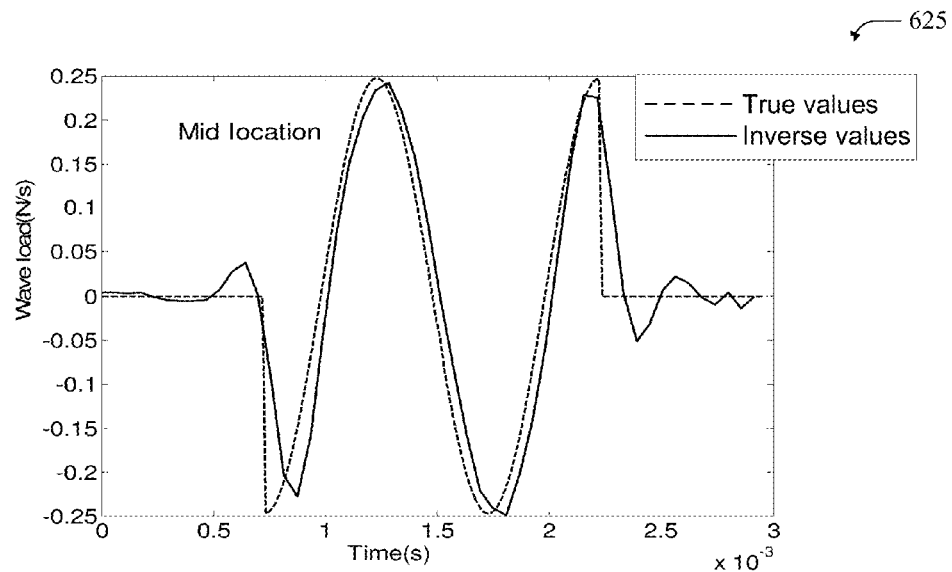
Figure 6C:
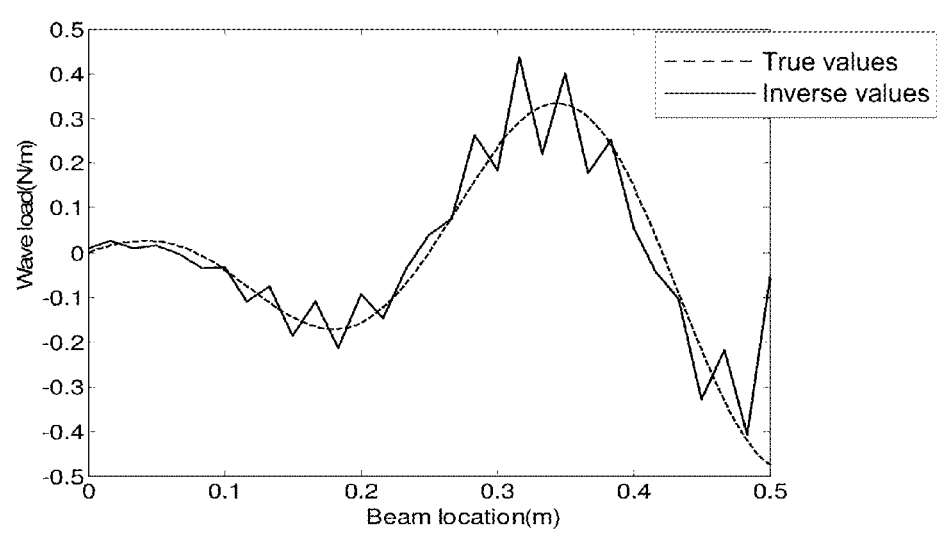

FIGS. 6A-6C illustrate example plots (600, 625, and 675) that depict reconstruction results of moving cosinusoidal wave loads with a sine function amplitude variance. The moving wave loads (e.g., inverse values determined by analysis component 104) are compared with true values (e.g., expected values) under background disturbance/noise level of 2%. In one aspect, the plots (600, 625, and 675) can be determined by analysis component 104 and rendered via display component 306. Plots (600, 625, and 675) depict a three half-cycle wave load with a half-cycle period of 0.0005 s. The amplitude of the cosinusoidal wave loads in each case is sin(x) Nm$^{-1}$, wherein x represents a beam location along the length direction, considering that the actual acoustic wave load amplitude is not constant and possibly varies with time and location.

Consider an example scenario wherein the wave load begins to progressively step on the beam structure until it is entirely on the beam structure. The wave load can be expressed as:

$$F(x, t) = -a(x)\cos\left\{\frac{2\pi}{T}(x - ct)\right\}\{1 - \hat{H}(x - ct)\}, 0 \le t \le NT, \quad (10a)$$

wherein N is the number of half-cycles, T is half-cycle time period, and Ĥ is the Heaviside step function. The speed of the wave is denoted by c, which for this example cases is considered to be the speed of sound in air. In this example case, a cosine function wave load with a(x)=sin(x) can be utilized, with x being the location along the length direction of the beam sensor. The equation (10a) represents a discrete number of half-cycles in a traveling sinusoidal wave. Once the load is completely on the sensor beam, the force can be expressed as:

$$F(x, t) = -a(x)\cos\left\{\frac{2\pi}{T}(x - ct)\right\}\{\hat{H}(x - c(t - NT)) - \hat{H}(x - ct)\}, \quad (10b)$$
$$NT \le t \le L/c,$$

until it reaches the other end of the beam structure. Finally, as the wave load begins to leave the beam structure, the force can be expressed as:

$$F(x, t) = -a(x)\cos\left\{\frac{2\pi}{T}(x - ct)\right\}\{\hat{H}(x - c(t - NT)) - \hat{H}(x - ct)\}, \quad (10c)$$
$$L/c \le t \le L/c + NT$$

Figure 7A:
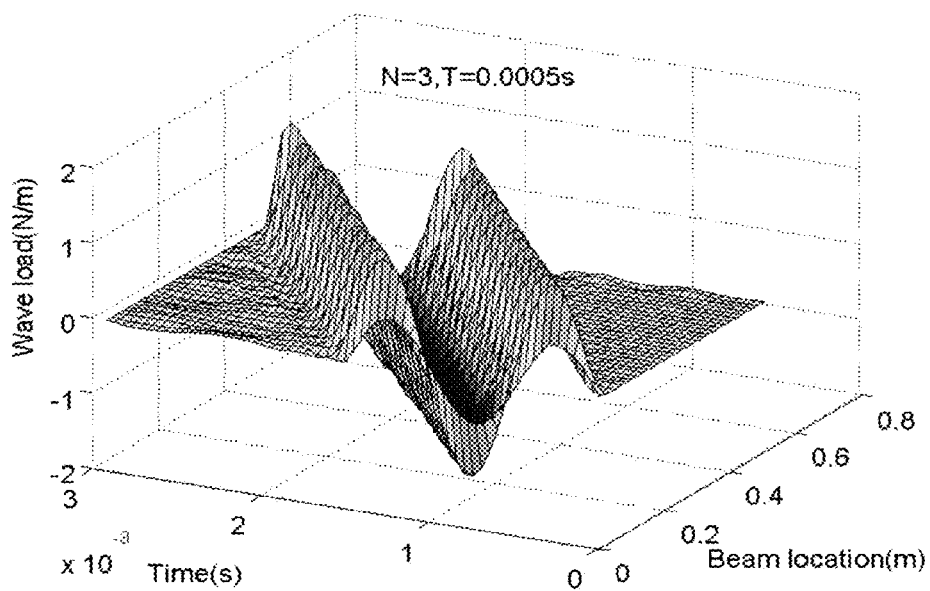
FIGS. 7A-7C illustrate example plots that depict reconstruction results of moving wave loads with combined sine and tangent function amplitude variances.
Figure 7B:
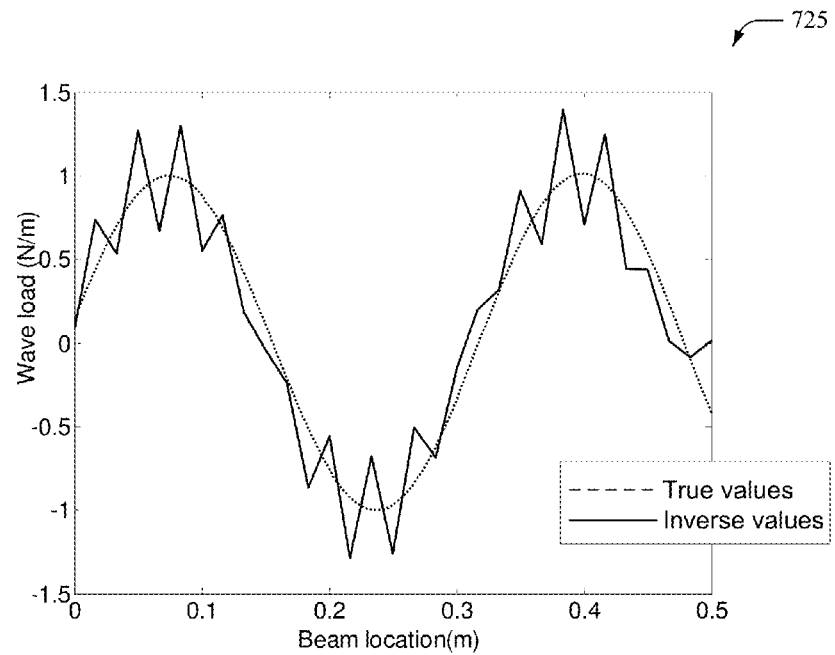
Figure 7C:
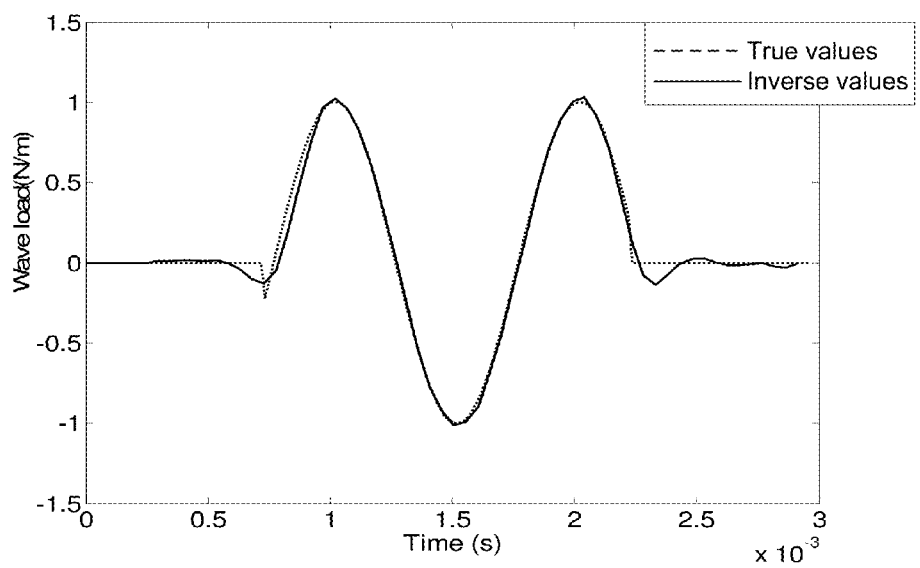

FIGS. 7A-7C illustrate example plots (700, 725, and 775) that depict reconstruction results of moving wave loads with combined sine and tangent function amplitude variances. The moving wave loads (e.g., inverse values determined by analysis component 104) are compared with true values (e.g., expected values) under background disturbance/noise level of 2%. In one aspect, the plots (700, 725, and 775) can be determined by analysis component 104 and rendered via display component 306. Plots (700, 725, and 775) depict a three half-cycle wave load with a half-cycle period of 0.0005 s. FIG. 7A depicts inverse results of moving cosine and sine wave combined functions with sin(x) and tan(x) functions as their respective amplitudes vary. As seen from FIGS. 7B and 7C depict, the inverse results closely follow (and/or match) the true values.

In this example scenario, sine and cosine wave functions are combined but each with different amplitudes $a_1(x)=\cos(x)$ and $a_2(x)=\tan(x)$, wherein x represents a beam location along the length direction, considering that the actual acoustic wave load amplitude is not constant and possibly varies with time and location.

Consider an example scenario wherein the wave load begins to progressively step on the beam structure until it is entirely on the beam structure. The wave load can be expressed as:

$$F(x, t) = -\left(a_1(x)\cos\left\{\frac{2\pi}{T}(x - ct)\right\} + a_2(x)\sin\left\{\frac{2\pi}{T}(x - ct)\right\}\right) \quad (11a)$$
$$\{1 - \hat{H}(x - ct)\}, 0 \le t \le NT,$$

wherein N is the number of half-cycles, T is half-cycle time period, and Ĥ is the Heaviside step function. The speed of the wave is denoted by c, which for this example cases is considered to be the speed of sound in air. The equation (11a) represents a discrete number of half-cycles in a traveling sinusoidal wave. Once the load is completely on the sensor beam, the force can be expressed as:

$$F(x, t) = -\left(a_1(x)\cos\left\{\frac{2\pi}{T}(x - ct)\right\} + a_2(x)\sin\left\{\frac{2\pi}{T}(x - ct)\right\}\right) \quad (11b)$$
$$\{\hat{H}(x - c(t - NT)) - \hat{H}(x - ct)\}, NT \le t \le L/c,$$

until it reaches the other end of the beam structure. Finally, as the wave load begins to leave the beam structure, the force can be expressed as:

$$F(x, t) = -\left(a_1(x)\cos\left\{\frac{2\pi}{T}(x - ct)\right\} + a_2(x)\sin\left\{\frac{2\pi}{T}(x - ct)\right\}\right) \quad (11c)$$
$$\{\hat{H}(x - c(t - NT)) - \hat{H}(x - ct)\}, L/c \le t \le L/c + NT$$

As shown in FIG. 5A, FIG. 6A and FIG. 7A, the sensor (106) provides information that can be utilized to render three dimensions of wave load reconstruction results. These results record propagation of wave loads through the sensor (106) during different time intervals and different sensor length locations. Further, FIG. 5B, FIG. 6B and FIG. 7B illustrate various wave loads that are passing through a specified sensor location x=0.25 m, which is exactly at mid-beam sensor location. It is noted that the subject specification is not limited to a mid-beam sensor location and that wave load at most any location on the beam structure can be determined and/or rendered. Furthermore, FIG. 5C, FIG. 6C and FIG. 7C illustrate various wave loads that are recorded at a specified time t=1.5×10$^{-03}$ s, describing the scenarios of wave loads propagating through the whole sensor. It is noted that the subject specification is not limited to a time of 1.5×10$^{-03}$ s and that wave load at most any time that the wave passes through the beam structure can be determined and/or rendered.

It is noted that although Eqns. (9a)-(9c), (10a)-(10c), and (11a)-(11c) represent sinusoidal wave loads traveling across the beam sensor structure in a direction parallel to the beam axial direction, the system and method described herein are not limited to determination of sinusoidal wave loads traveling parallel to the beam axial direction and that wave loads travelling in most any direction, regardless of the angle from which the acoustic waves move across the beam sensor (e.g., at oblique angles). In addition, the one-dimensional approach can be extended for reconstruction along more than one axis.

Figure 8:
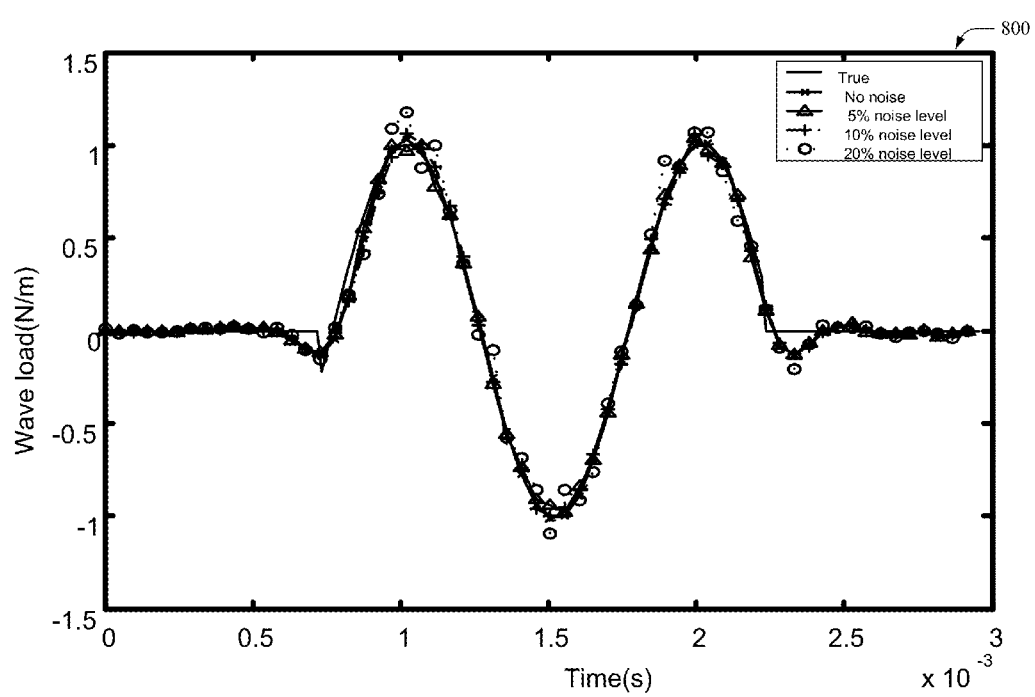
FIG. 8 illustrates an example plot that depicts a comparison of exact and inverse results under different noise levels.

FIG. 8 illustrates an example plot 800 that depicts a comparison of exact/expected and inverse results under different noise levels at mid-location on the beam structure, e.g., x=0.25 m, N=3, T=0.0005 s. As seen from plot 800, the true values and the inverse results (e.g., determined by system 100) match even with significant noise/disturbance (e.g., 20% noise level). Accordingly, the sensing system disclosed herein has high accuracy even though a high level of noise is present.

Figure 9:
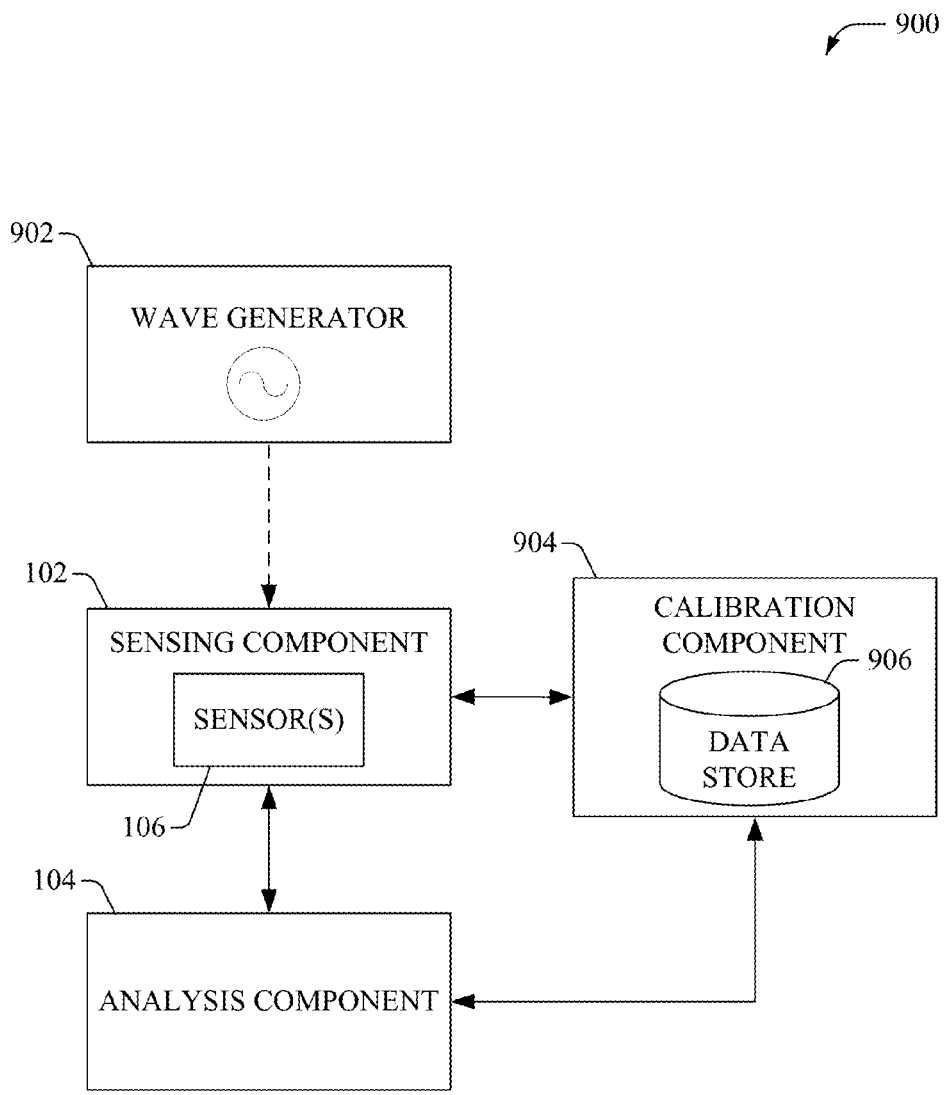
FIG. 9 illustrates an example system that facilitates calibration of a wave load sensor.

FIG. 9 illustrates an example system 900 that facilitates calibration of a wave load sensor, according to an aspect of the subject specification. Sensor calibration is a prerequisite in achieving high sensing accuracy and reliability. Before the sensor is employed to determine an arbitrary wave, system 900 can be utilized to calibrate the sensor, for example, during an initialization stage. It can be noted that the sensing component 102, the analysis component 104 and sensor(s) 106, can include functionality, as more fully described herein, for example, with regard to system 100-300.

In one aspect, a wave generator 902 can be utilized to generate a standard sinusoidal wave that is employed to test the sensor. As an example, the wave generator 902 can include most any acoustic sinusoidal wave generator, such as, but not limited to a sine wave generator using a numerically controlled oscillator module. According to an aspect, during the calibration/initialization stage, the sensor(s) 106 can be place within a defined distance (e.g., in front of) the wave generator 902. The standard sinusoidal wave load generated by the wave generator 902 propagates through the sensor(s) 106. As an example, the analysis component 104 can reconstruct the standard sinusoidal wave load (e.g., by utilizing the Arnoldi-Tikhonov technique described in detail supra). In one aspect, a calibration component 904 can compare the reconstructed wave load with the standard sinusoidal wave (e.g., stored in data store 906) at different times and/or different sensor locations. If the reconstructed wave load and the standard sinusoidal wave do not satisfy an accuracy criterion (e.g., do not match), the calibration component 904 can adjust sensor parameters, such as, but not limited to, calculation of convergence accuracy utilized by the analysis component 104 for wave reconstruction. Accordingly, the calibration component 904 can optimize sensor parameters (e.g., for high accuracy) based on a trial-and-error technique. Once the sensor(s) 106 has been calibrated, the sensor(s) 106 can be utilized to facilitate determination of arbitrary moving wave loads. Additionally or alternatively, response sensitivity analysis can be employed for improving the design of sensor structure parameters and hence, optimizing sensor length and thickness parameters to improve sensor sensitivity.

Figure 10:
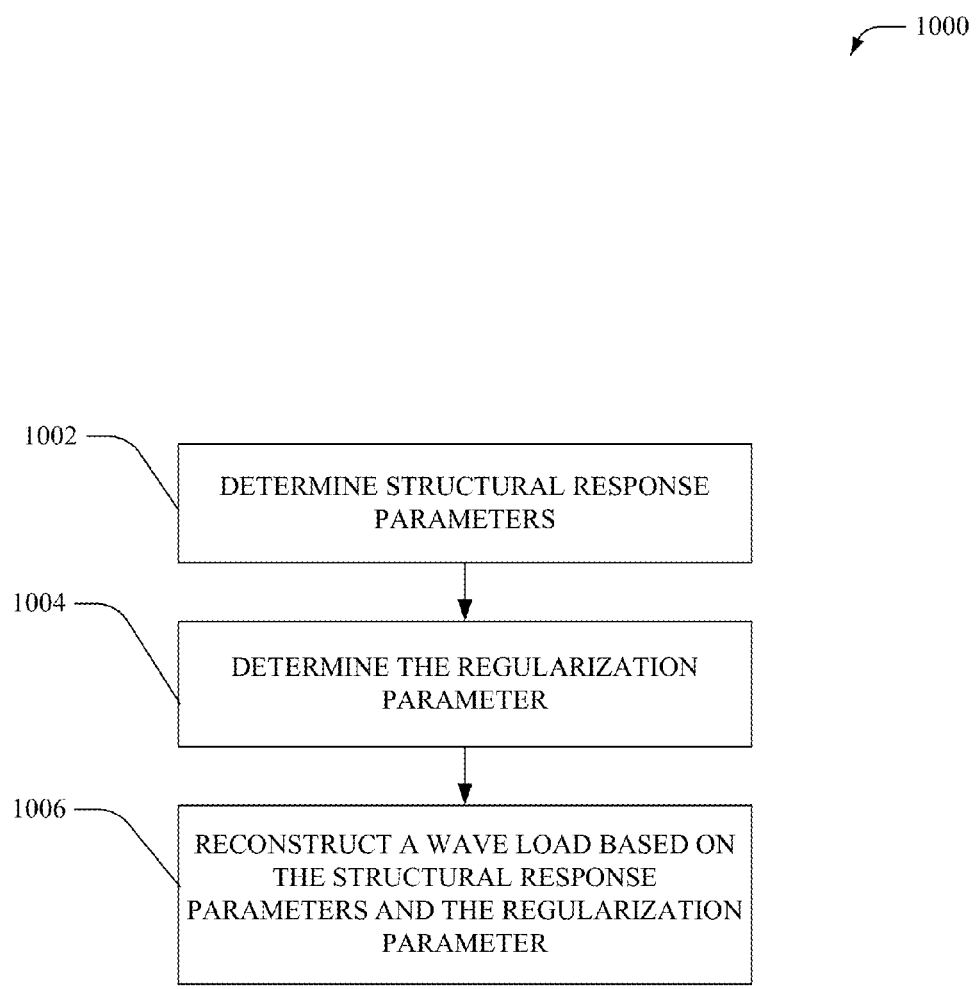
FIG. 10 illustrates an example method that can be utilized to facilitate arbitrary wave load detection.
Figure 11:
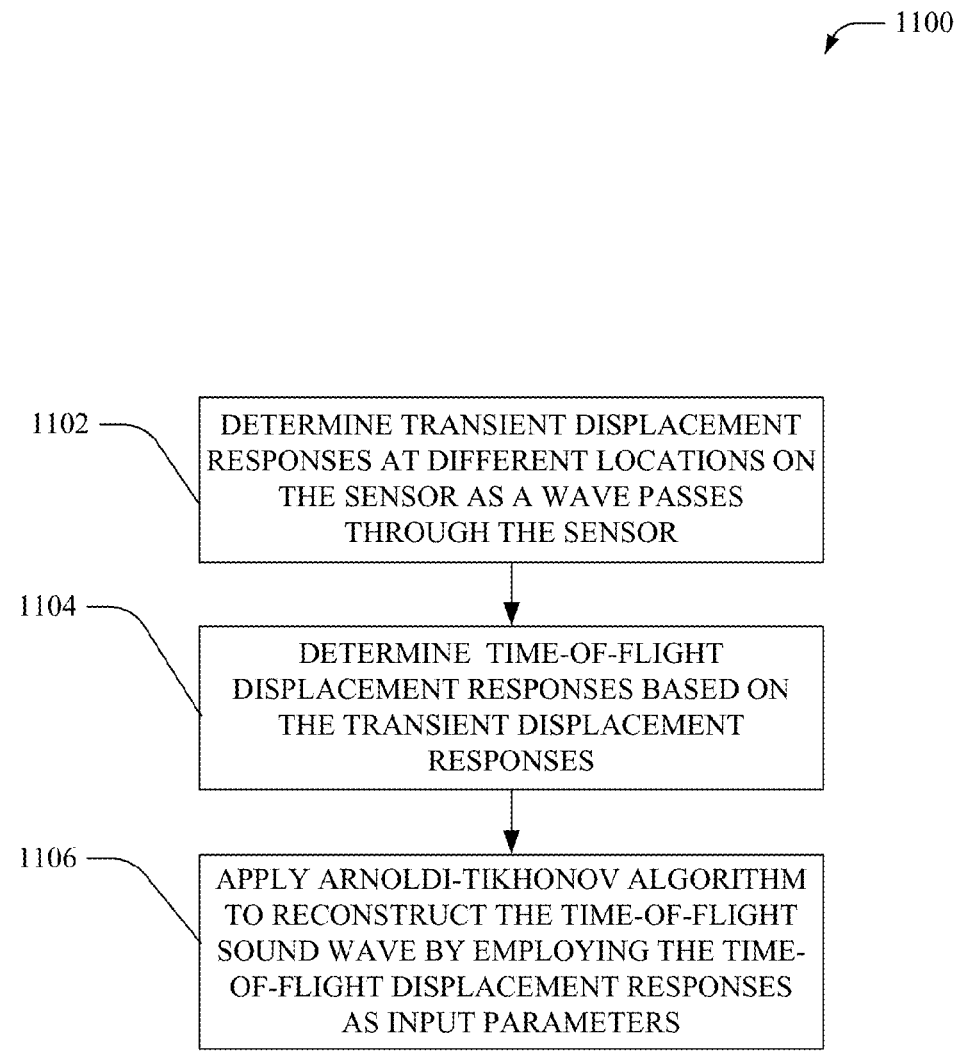
FIG. 11 illustrates an example method that facilitates sensing and detection of an arbitrary moving wave.

FIGS. 10-11 illustrate methods and/or flow diagrams in accordance with the disclosed subject matter. For simplicity of explanation, the methods are depicted and described as a series of acts. It is to be understood and appreciated that the subject embodiments is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram of events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 10, illustrated is an example method 1000 that can be utilized to facilitate arbitrary wave load detection, according to an aspect of the subject specification. At 1002, structural response parameters can be determined. As an example, a sensor comprising a sandwich-structured beam of composite materials can be utilized to generate structural response parameters when a moving wave propagates across the beam. The moving wave load can be computed based on an inverse mechanism of the continuous structure response (e.g., which is different from the working principle of popular sensors relying on the piezoelectricity phenomenon). At 1004, a regularization parameter can be determined. As an example, an Arnoldi-Tikhonov algorithm coupled with generalized cross-validation technique can be utilized to determine the regularization parameter. The regularization parameter can be utilized to compensate for the presence of noise in the wave load and/or the highly ill-posed problems of the inverse matrix that is utilized for wave reconstruction. At 1106, the wave load can be reconstructed (e.g., at different locations on the beam and/or different instances of time) based on the structural response parameters and the regularization parameter. In one aspect, the Tikhonov algorithm can be utilized to reconstruct wave loads. As an example, an image of the determined wave load values can be rendered in three dimensions (3-D) versus time and location.

FIG. 11 illustrates an example method 1100 that facilitates sensing and detection of an arbitrary moving wave in accordance with an aspect of the subject specification. Moreover, method 1100 can be implemented by an acoustic sensor comprising a sandwich-structure beam with composite materials that is fabricated by attaching two thin and stiff carbon/epoxy facings to a light-weighted and thick foam material core. As an example, the foam core is of low strength, but its high thickness provides the sandwich-composite with high bending, stiffness, and an overall low density. Further, the carbon/epoxy facings can be bonded to the core with an epoxy adhesive (e.g., Hysol EA 9430). At 1102, transient displacement responses at different locations on the sensor and/or different times can be determined. As an example, transient displacement responses for 25 locations along the middle line direction on the sensor structure can be determined. At 1102, time-of-flight displacement responses under excitation of the time-of-flight sound wave passing by can be represented by the transient responses at the different locations. Further, at 1106, an Arnoldi-Tikhonov algorithm can be applied to reconstruct the time-of-flight sound wave by employing the time-of-flight displacement responses as input parameters.

Figure 12:
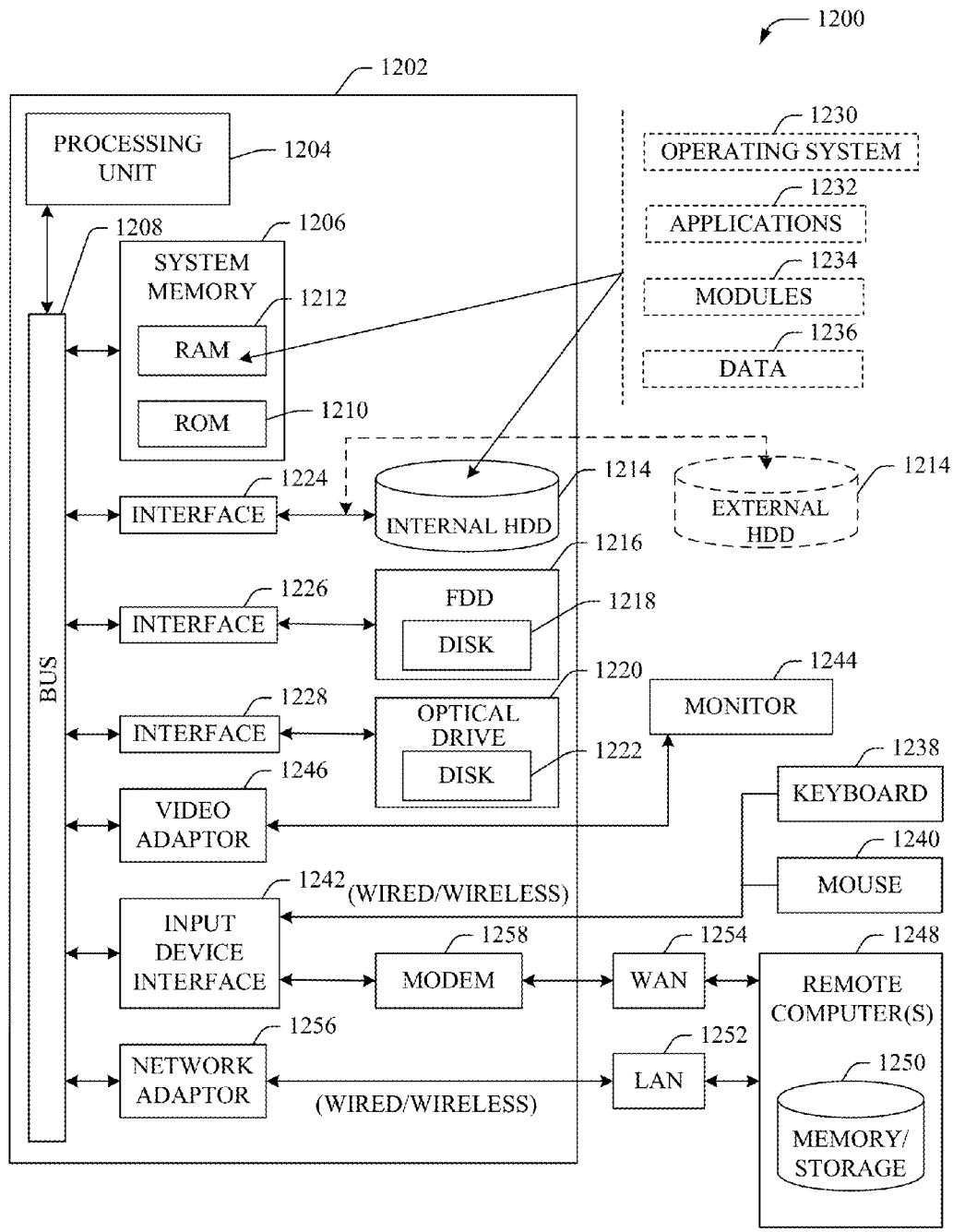
FIG. 12 illustrates a block diagram of a computer operable to execute the disclosed sensing architecture.

Referring now to FIG. 12, there is illustrated a block diagram of a computer operable to execute the disclosed sensing architecture. In order to provide additional context for various aspects of the subject specification, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 12, the example environment 1200 for implementing various aspects of the specification includes a computer 1202, the computer 1202 including a processing unit 1204, a system memory 1206 and a system bus 1208. As an example, the system(s) and/or component(s) (e.g., sensing component 102, analysis component 104, regularization component 301, wave reconstruction component 304, display component 306, wave generator 902, calibration component 904, etc.) disclosed herein with respect to systems 100-900 can each include at least a portion of the computer 1202. In another example, a combination of the systems and/or components can each include one or more computers such as, or substantially similar to, computer 1202. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and a pointing device, such as a mouse 1240 or a touchscreen or touchpad (not illustrated). These and other input devices are often connected to the processing unit 1204 through an input device interface 1242 that is coupled to the system bus 1208, but can be connected by other interfaces, such as a parallel port, an IEEE 1394 serial port, a game port, a USB port, an infrared (IR) interface, etc. A monitor 1244 or other type of display device is also connected to the system bus 1208 via an interface, such as a video adapter 1246.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A system, comprising:
 a wave load sensor comprising a sandwich-structured beam that is fabricated by employing composite materials, wherein the wave load sensor is employable to sense an arbitrary acoustic wave; and the executable components comprising:
 a sensing component configured to determine displacement response parameter data as the arbitrary acoustic wave is determined to propagate through the sandwich-structured beam; and an analysis component configured to determine, based on an inverse analysis that employs the displacement response parameter data, load data representing the arbitrary acoustic wave.

2. The system of claim 1, wherein the sandwich-structured beam comprises a core material inserted between two facings.

3. The system of claim 2, wherein the core material comprises a foam core.

4. The system of claim 2, wherein the two facings comprise a carbon facing or an epoxy facing.

5. The system of claim 2, wherein the sandwich-structured beam is bonded to an elastic foundation base comprising at least a defined elasticity characteristic.

6. The system of claim 5, wherein the elastic foundation base comprises a rubber base.

7. The system of claim 1, wherein the sensing component is configured to determine the displacement response parameter data based on time-of-flight measurement data.

8. The system of claim 1, wherein the executable components further comprise:
a regularization component that is configured to select, based on employing an Arnoldi-Tikhonov process and a generalized cross-validation process, regularization parameter data that is utilized to compensate for an error introduced during the inverse analysis, wherein the error is introduced in a solution of an inverse matrix having a conditioning number that satisfies a defined ill-conditioning criterion.

9. The system of claim 8, wherein the executable components further comprise:
an arbitrary wave reconstruction component that is configured to determine the load data based on the regularization parameter data.

10. The system of claim 1, wherein the analysis component is further configured to determine, based on the inverse analysis, load data representing the arbitrary acoustic wave at a specified location on the sandwich-structured beam.

11. The system of claim 1, wherein the analysis component is further configured to determine, based on the inverse analysis, load data representing the arbitrary acoustic wave at a specified time.

12. The system of claim 1, wherein the analysis component is further configured to determine, based on the inverse analysis, direction data indicative of a direction of propagation of the arbitrary acoustic wave.

13. A method, comprising:
sensing an arbitrary acoustic wave propagating through a wave load sensor that comprises a layered beam structure made of composite materials;
as a function of the sensed arbitrary acoustic wave, determining, by a system, displacement response parameter data associated with the layered beam structure;
based on an inverse analysis that employs the displacement response parameter data, determining load data; and
based on the load data, facilitating a reconstruction of the arbitrary acoustic wave.

14. The method of claim 13, wherein the determining the displacement response parameter data comprises determining the displacement response parameter data based on time-of-flight measurement data.

15. The method of claim 13, wherein the determining the load data comprises determining a load associated with the arbitrary acoustic wave at least one of at a specified time or a specified location on the layered beam structure.

16. The method of claim 13, further comprising:
based on the load data, facilitating a rendering a three-dimensional image of the arbitrary wave.

* * * * *